(12) United States Patent
Banholzer

(10) Patent No.: US 11,384,719 B2
(45) Date of Patent: Jul. 12, 2022

(54) FLUID TANK FOR A POWER TOOL

(71) Applicant: MILWAUKEE ELECTRIC TOOL CORPORATION, Brookfield, WI (US)

(72) Inventor: Hans T. Banholzer, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 146 days.

(21) Appl. No.: 16/817,917

(22) Filed: Mar. 13, 2020

(65) Prior Publication Data
US 2020/0291909 A1 Sep. 17, 2020

Related U.S. Application Data

(60) Provisional application No. 62/819,058, filed on Mar. 15, 2019.

(51) Int. Cl.
| | | |
|---|---|---|
| *F02M 37/00* | (2006.01) | |
| *B25F 5/02* | (2006.01) | |
| *F16N 7/14* | (2006.01) | |
| *A01G 3/08* | (2006.01) | |

(52) U.S. Cl.
CPC ......... *F02M 37/0047* (2013.01); *A01G 3/086* (2013.01); *B25F 5/02* (2013.01); *F16N 7/14* (2013.01)

(58) Field of Classification Search
CPC ............. F02M 37/0047; F02M 37/007; F02M 37/0082; B25F 5/02; F16N 7/14; F16N 1/00
See application file for complete search history.

(56) References Cited

U.S. PATENT DOCUMENTS

| | | | |
|---|---|---|---|
| 2,611,512 A | * | 9/1952 | Fashay ................. B65D 88/60 220/88.1 |
| 3,476,960 A | | 11/1969 | Rees |
| 3,617,034 A | * | 11/1971 | Skinner ............ B60K 15/03504 261/22 |
| 3,625,292 A | | 12/1971 | Lay |
| 3,639,789 A | | 2/1972 | Bednarski |
| 3,657,813 A | | 4/1972 | Knight |
| 3,737,987 A | | 6/1973 | Bednarski |

(Continued)

FOREIGN PATENT DOCUMENTS

| | | |
|---|---|---|
| CN | 2900911 Y | 5/2007 |
| CN | 101006763 A | 8/2007 |

(Continued)

*Primary Examiner* — Grant Moubry
(74) *Attorney, Agent, or Firm* — Michael Best & Friedrich LLP

(57) ABSTRACT

A power tool includes a tool head having a working element and a powerhead configured to provide power to the working element. The powerhead includes a fluid tank configured to hold a combustible fuel and defines an initial internal volume having an internal pressure. A diaphragm is formed of a flexible material and forms at least a portion of the fluid tank. The diaphragm moves from an unexpanded state to an expanded state when a temperature of the combustible fuel increases above a threshold value. Movement of the diaphragm to the expanded state increases the internal volume of the fluid tank to allow the internal pressure of the fluid tank to remain approximately constant.

22 Claims, 11 Drawing Sheets

(56) References Cited

U.S. PATENT DOCUMENTS

| | | | |
|---|---|---|---|
| 3,737,988 A | 6/1973 | Bednarski | |
| 3,747,800 A * | 7/1973 | Viland | B60K 15/03504 220/723 |
| 3,750,730 A * | 8/1973 | Dorsch | B32B 29/06 383/96 |
| 3,779,420 A * | 12/1973 | Knaus | B29C 65/5028 220/4.14 |
| 3,838,795 A * | 10/1974 | Berg | B60K 15/03 222/105 |
| 3,845,841 A * | 11/1974 | Kloefkorn | B60K 15/06 180/69.4 |
| 3,865,213 A | 2/1975 | McDermott | |
| 3,917,117 A * | 11/1975 | Plotsky | B65D 88/66 222/94 |
| 3,968,896 A * | 7/1976 | Giacoletti | B60K 15/03 73/306 |
| 3,983,857 A * | 10/1976 | O'Connor | F02M 1/16 123/179.11 |
| 4,135,562 A * | 1/1979 | Martineau | B60K 15/04 141/285 |
| 4,142,756 A * | 3/1979 | Henning | B60K 15/0406 296/97.22 |
| 4,168,012 A * | 9/1979 | Hawkinson | B60K 15/0406 220/203.16 |
| 4,168,687 A * | 9/1979 | Kurahashi | F02M 37/20 123/510 |
| 4,172,573 A * | 10/1979 | Moore | B64D 37/08 244/135 R |
| 4,178,894 A * | 12/1979 | Nau | F02M 25/0836 123/572 |
| 4,337,873 A * | 7/1982 | Johnson | B60K 15/0406 137/493.8 |
| 4,353,163 A | 10/1982 | Overbury et al. | |
| 4,360,124 A * | 11/1982 | Knaus | B60K 15/00 220/62.19 |
| 4,463,498 A | 8/1984 | Everts | |
| 4,505,040 A | 3/1985 | Everts | |
| 4,644,658 A | 2/1987 | Dolata et al. | |
| 4,654,971 A | 4/1987 | Fettes et al. | |
| 4,676,463 A * | 6/1987 | Tansill | B64D 37/32 137/74 |
| 4,733,471 A | 3/1988 | Rahe | |
| 4,750,518 A * | 6/1988 | Griffin | F02M 37/0017 137/565.17 |
| 4,794,273 A | 12/1988 | McCullough et al. | |
| 4,833,973 A * | 5/1989 | Wang | F15B 15/10 267/117 |
| 4,899,446 A | 2/1990 | Akiba et al. | |
| 4,916,818 A | 4/1990 | Panek | |
| 4,924,573 A | 5/1990 | Huddleston et al. | |
| 4,928,390 A | 5/1990 | Gassen et al. | |
| 4,948,070 A * | 8/1990 | Lyman | B64D 37/06 220/720 |
| 4,991,298 A | 2/1991 | Matre | |
| 5,013,282 A | 5/1991 | Keller | |
| 5,269,733 A | 12/1993 | Anthony, III | |
| 5,662,428 A | 9/1997 | Wilson | |
| 5,718,050 A | 2/1998 | Keller et al. | |
| 5,819,418 A | 10/1998 | Uhl | |
| 5,913,451 A * | 6/1999 | Madison | B60K 15/01 220/723 |
| 5,926,961 A | 7/1999 | Uhl | |
| 5,933,966 A | 8/1999 | Yates et al. | |
| 6,111,187 A * | 8/2000 | Goyette | B63B 11/04 114/20.1 |
| 6,155,448 A * | 12/2000 | Ishikawa | B60K 15/03 220/562 |
| 6,182,367 B1 | 2/2001 | Janczak | |
| 6,722,041 B2 | 4/2004 | Warashina et al. | |
| 6,739,058 B2 | 5/2004 | Warashina et al. | |
| 6,754,963 B2 | 6/2004 | Warashina et al. | |
| 6,880,248 B2 | 4/2005 | Weissert et al. | |
| 7,296,600 B2 * | 11/2007 | Ferreria | F02M 25/0836 141/46 |
| 7,449,810 B2 | 11/2008 | Yokota et al. | |
| 7,913,403 B1 | 3/2011 | Willetts | |
| 8,136,254 B2 | 3/2012 | Gieske et al. | |
| 8,191,268 B2 | 6/2012 | Willetts | |
| 8,253,285 B2 | 8/2012 | Yoshida et al. | |
| 8,541,913 B2 | 9/2013 | Yoshida et al. | |
| 8,574,037 B2 | 11/2013 | Kresge | |
| 8,672,162 B2 | 3/2014 | Okouchi | |
| 8,769,829 B2 | 7/2014 | Pellenc | |
| 8,882,166 B2 | 11/2014 | Ramsey et al. | |
| 9,009,920 B1 | 4/2015 | Ramsey et al. | |
| 9,009,921 B1 | 4/2015 | Ramsey et al. | |
| 9,220,201 B2 | 12/2015 | Kratzig et al. | |
| 9,309,844 B2 * | 4/2016 | McLain | F02M 37/0076 |
| 9,391,491 B2 | 7/2016 | Yoshida et al. | |
| 9,591,809 B2 | 3/2017 | Gieske et al. | |
| 9,630,489 B2 * | 4/2017 | Shimokawa | B60K 15/03504 |
| 9,876,201 B2 | 1/2018 | Ishikawa et al. | |
| 9,897,135 B2 | 2/2018 | Miyakawa | |
| 10,188,044 B1 | 1/2019 | Blackburn, Jr. | |
| 10,302,142 B2 | 5/2019 | Densborn et al. | |
| 11,130,400 B2 * | 9/2021 | Esser | B29C 66/532 |
| 2001/0032624 A1 * | 10/2001 | Perry | F02M 25/0809 123/510 |
| 2002/0036204 A1 * | 3/2002 | Miura | B60K 15/03519 220/562 |
| 2003/0229993 A1 | 12/2003 | Agne | |
| 2005/0023236 A1 * | 2/2005 | Adams | F16K 24/04 215/3 |
| 2006/0157117 A1 * | 7/2006 | Scott | F16K 24/06 137/526 |
| 2007/0051740 A1 * | 3/2007 | Huang | H01M 8/04216 220/4.13 |
| 2007/0199957 A1 * | 8/2007 | Wu | G01F 11/021 222/389 |
| 2008/0236124 A1 | 10/2008 | Heinzelmann | |
| 2011/0162214 A1 | 7/2011 | Codeluppi | |
| 2013/0048639 A1 * | 2/2013 | Wiese | B60K 15/03504 220/315 |
| 2015/0336288 A1 | 11/2015 | Hallendorff et al. | |
| 2016/0238082 A1 | 8/2016 | Densborn et al. | |
| 2016/0318171 A1 | 11/2016 | Gonzales | |
| 2017/0079215 A1 | 3/2017 | Bian et al. | |
| 2017/0232601 A1 | 8/2017 | Gieske et al. | |
| 2017/0295721 A1 | 10/2017 | Carl | |
| 2018/0119726 A1 | 5/2018 | Weissert et al. | |
| 2018/0147712 A1 | 5/2018 | Hita | |
| 2018/0177135 A1 | 6/2018 | Fu | |
| 2018/0184568 A1 | 7/2018 | Martin et al. | |
| 2018/0186027 A1 | 7/2018 | McRoberts et al. | |
| 2020/0047610 A1 * | 2/2020 | Freytag | B60K 15/03177 |

FOREIGN PATENT DOCUMENTS

| | | |
|---|---|---|
| CN | 201044581 Y | 4/2008 |
| CN | 201579743 U | 9/2010 |
| CN | 102079073 A1 | 6/2011 |
| CN | 201913627 U | 8/2011 |
| CN | 202524761 U | 11/2012 |
| CN | 104675439 A | 6/2015 |
| CN | 105453911 A | 4/2016 |
| CN | 205454778 U | 8/2016 |
| CN | 106900386 A | 6/2017 |
| CN | 108142138 A | 6/2018 |
| DE | 2413974 A1 | 9/1974 |
| DE | 3213185 A1 | 10/1983 |
| DE | 10313372 A1 | 10/2004 |
| DE | 10313675 A1 | 10/2004 |
| DE | 102012203221 A1 | 9/2013 |
| EP | 3192469 A2 | 8/1986 |
| EP | 3162519 A1 | 5/2017 |
| WO | 2013097778 A1 | 7/2013 |
| WO | 2016056884 A1 | 4/2016 |

(56) References Cited

FOREIGN PATENT DOCUMENTS

| WO | 2016184959 A1 | 11/2016 |
| WO | 2018204468 A1 | 11/2018 |

\* cited by examiner

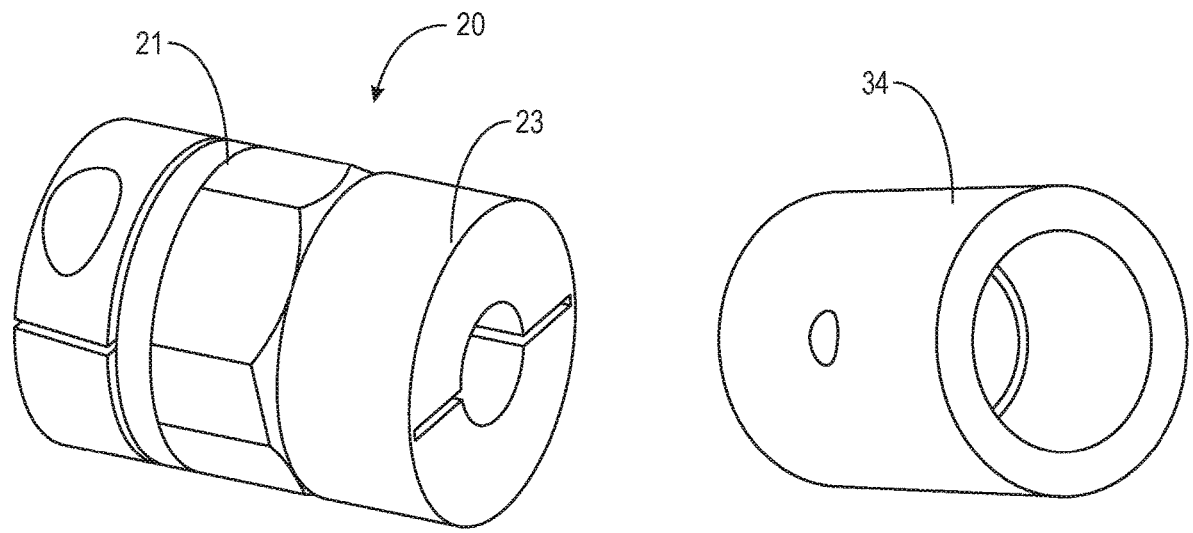
FIG. 5
FIG. 6
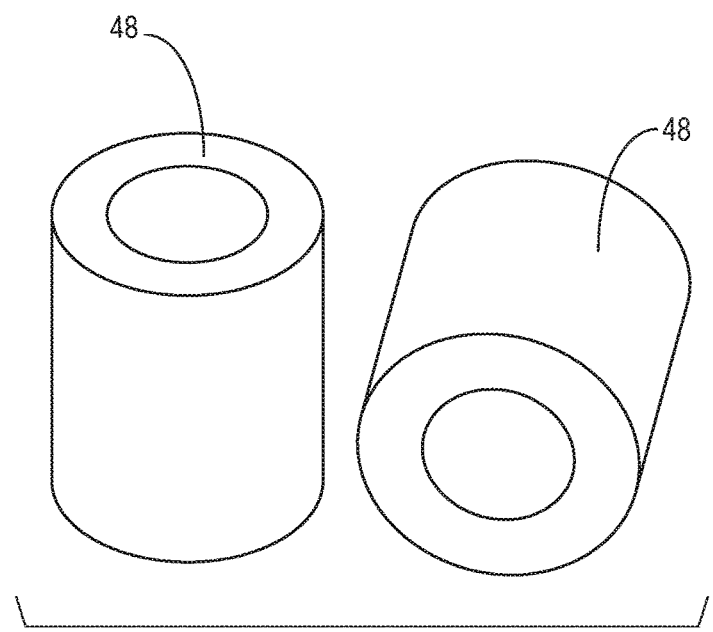
FIG. 7

FLUID TANK FOR A POWER TOOL

CROSS REFERENCE TO RELATED APPLICATION

This application claims priority to U.S. Provisional Patent Application No. 62/819,058, filed Mar. 15, 2019, the entire content of which is incorporated herein by reference.

FIELD OF THE INVENTION

The present disclosure relates to power tools, such as pole saws and chain saws, and more particularly to powerheads of the power tools having a fluid tank that holds a combustible fuel. The fluid tank includes a diaphragm that allows the internal pressure of the fluid tank to remain constant as the temperature of the combustible fuel inside the fluid tank increases.

BACKGROUND OF THE INVENTION

Power tools, such as pole saws, chain saws, etc., typically include a tool head having a working element and powerhead that provides power to the working element. The powerhead may include a rigid fluid tank (e.g., oil, gas, etc.). As the power tool is operated, the internal pressure of the oil tank may increase as the ambient temperature rises within the fluid tank (e.g., due to expansion of the contents within the fluid tank). The rise in internal pressure may lead to fluid leaking from the fluid tank. As such, there is a desire to maintain a constant pressure within the fluid tank to improve operation of the power tool and limit leaking of the fluid tank.

SUMMARY OF THE INVENTION

The present invention provides, in one aspect, a power head for a power tool. The power head includes a fluid tank configured to hold a combustible fuel, the fluid tank defining an initial internal volume having an internal pressure. A diaphragm forming at least a portion of the fluid tank. The diaphragm formed of a flexible material to allow the diaphragm move between an unexpanded state and an expanded state. The diaphragm being configured to move from the unexpanded state to the expanded state when a temperature of the combustible fuel increases. The movement of the diaphragm to the expanded state increases the internal volume of the fluid tank to allow the internal pressure of the fluid tank to remain at a near constant state.

In another aspect, the present invention provides a power tool. The power tool includes a tool head having a working element and a powerhead configured to provide power to the working element. The powerhead including a fluid tank configured to hold a combustible fuel. The fluid tank defining an initial internal volume having an internal pressure. The diaphragm forming at least a portion of the fluid tank. The diaphragm formed of a flexible material to allow the diaphragm to expand in response to an increase in internal pressure of the fluid tank. Where expansion of the diaphragm increases the internal volume of the fluid tank to allow the internal pressure of the fluid tank to remain at a near constant state In another aspect, the present invention provides a cap for a fluid tank of a power tool. The cap including a body defining a handle configured to be grasped by a user, a threaded portion configured to be attached to the fluid tank, an internal channel, and a breather aperture in communication with the internal channel. A diaphragm supported by a ledge within the internal channel, the diaphragm being positioned between the internal channel and the breather aperture to seal the fluid tank. The diaphragm being formed of a flexible material to allow the diaphragm to move between an unexpanded state and an expanded state in response to an increase in an internal pressure of the fluid tank. Movement of the diaphragm to the expanded state allows excess pressure to be released out of the internal channel and through the breather aperture.

Other features and aspects of the invention will become apparent by consideration of the following detailed description and accompanying drawings.

BRIEF DESCRIPTION OF THE DRAWINGS

FIG. 5 is a perspective view of an output drive gear of the pole saw of FIG. 1.

FIG. 6 is a perspective view of a shaft sleeve or shaft liner of the pole saw of FIG.

FIG. 7 is a perspective view of a bushing or coating of the pole saw of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1:
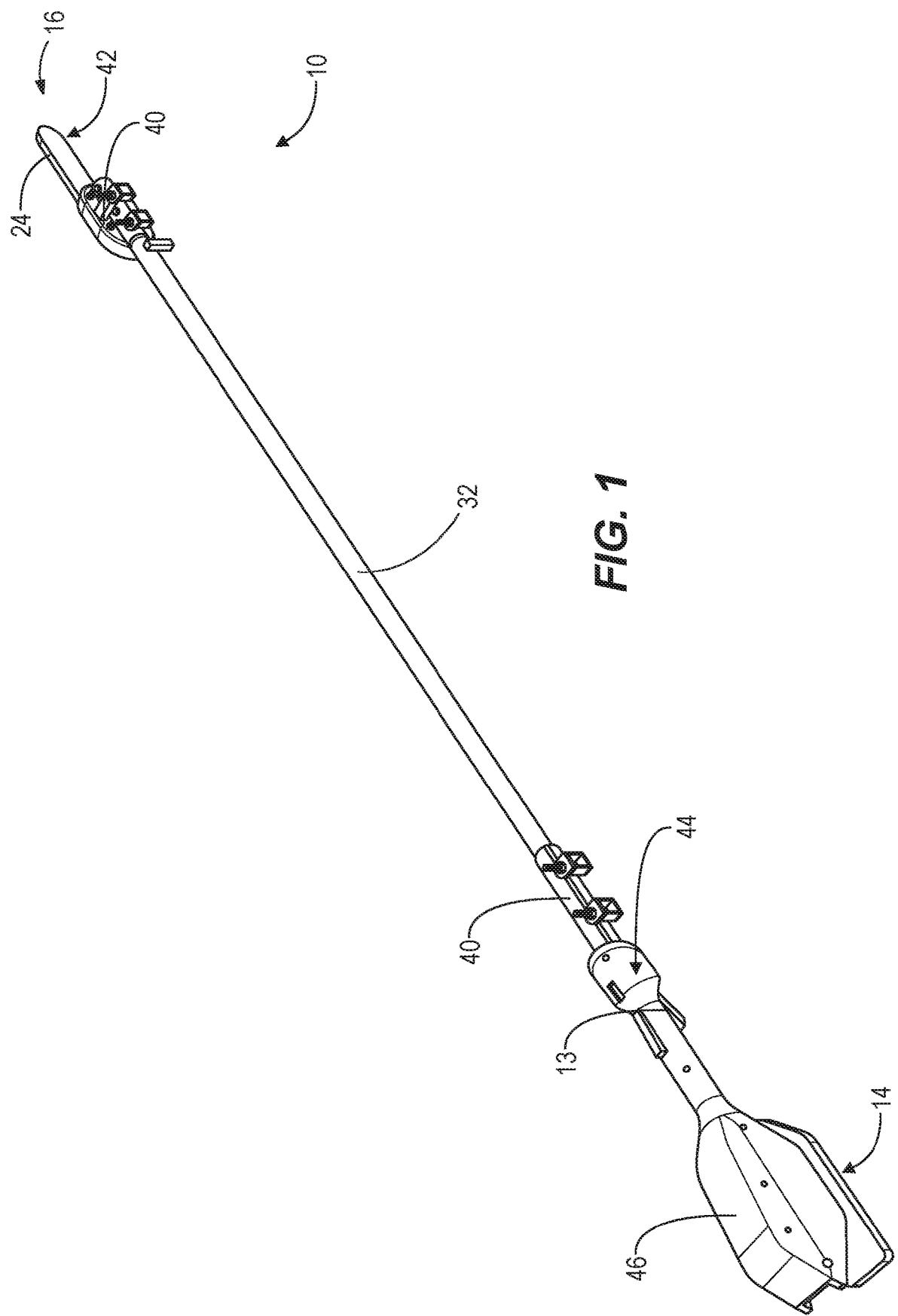
FIG. 1 is a perspective view of a pole saw according to one embodiment of the invention.
Figure 2:
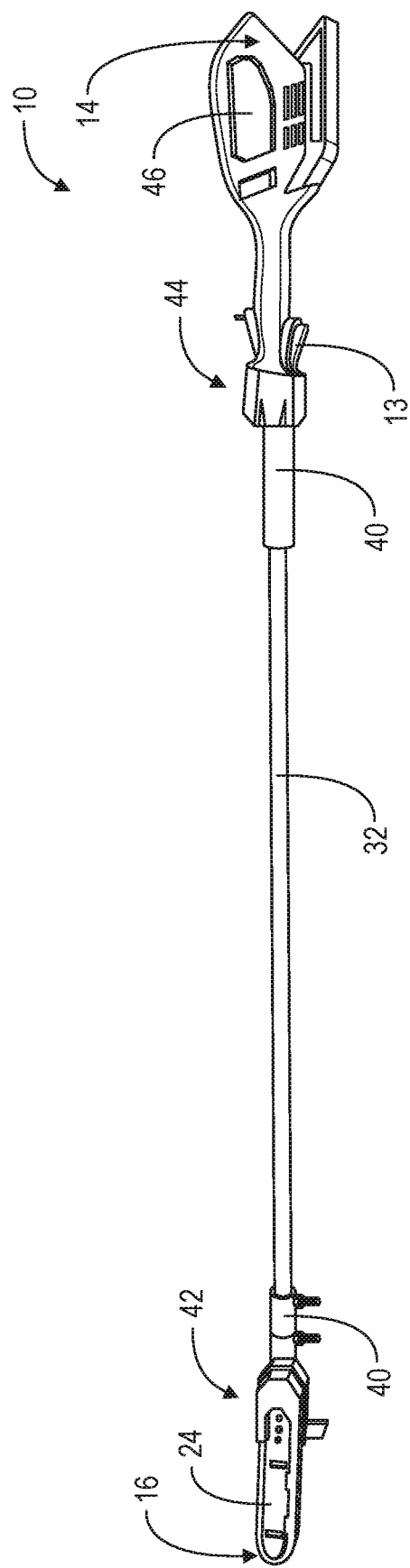
FIG. 2 is a side elevation view of the pole saw of FIG. 1.

FIGS. 1 and 2 illustrate a power tool 10, such as a pole saw, for use in performing outdoor tasks such as cutting tree branches. The power tool 10 includes an elongated shaft forming a handle 32, a tool or saw head 42 at one end of the handle 32, and a powerhead 46 at an opposite end of the handle 32. The tool head 42 includes a working element 24, such as a saw chain for performing cutting. The powerhead 46 includes a user-activated switch 13 to selectively generate a motive force to drive the working element 24 during operation of the power tool 10. In some embodiments, the powerhead 46 may be an electric motor powered by a removable battery pack (not shown) supported by the powerhead 46. In other embodiments, the powerhead 46 may be an internal combustion engine powered by a combustible fuel.

Figure 3:
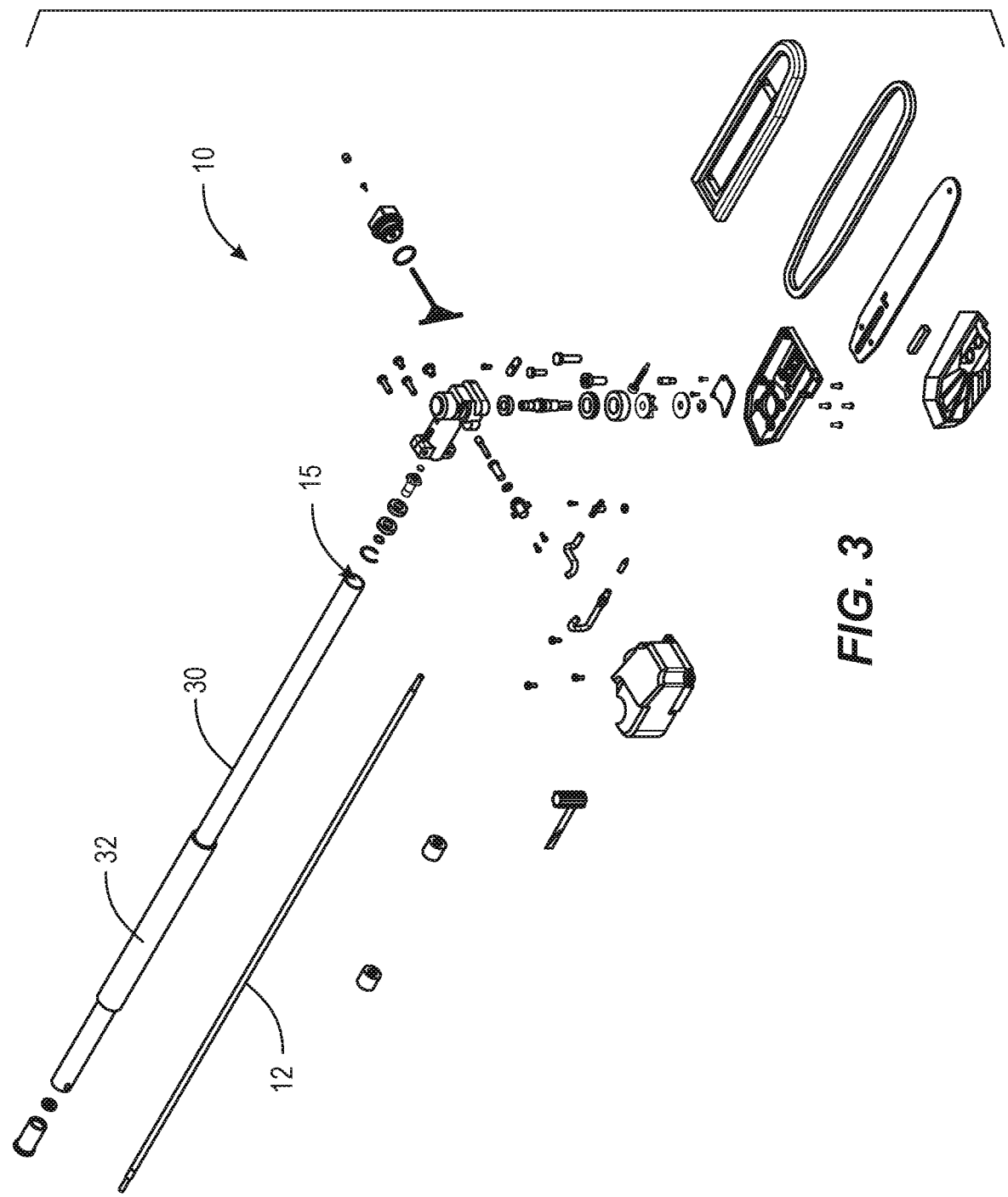
FIG. 3 is a partial exploded perspective view of the pole saw of FIG. 1.
Figure 4:
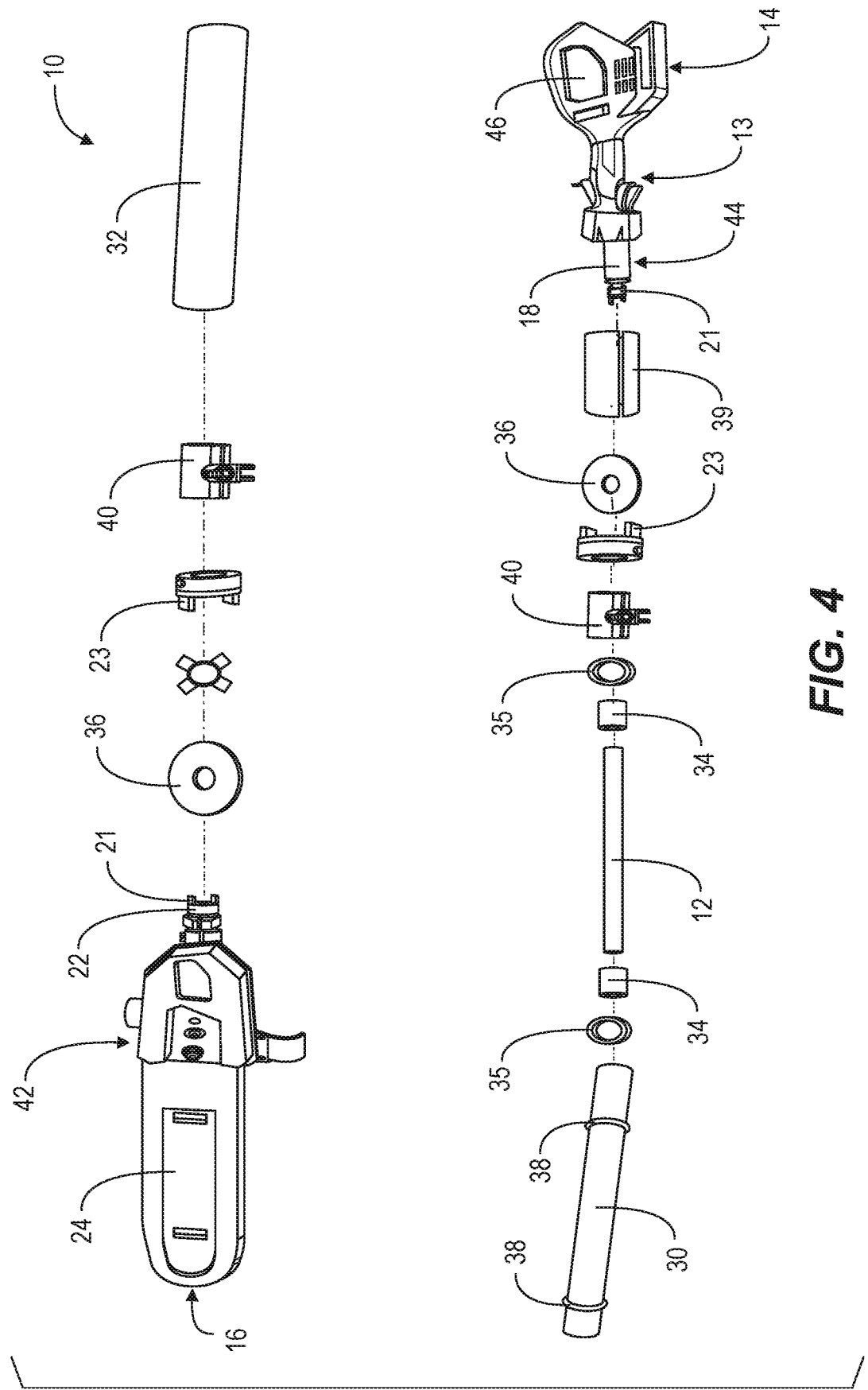
FIG. 4 is an exploded side elevation view of the pole saw of FIG. 1.

With reference to FIGS. 3 and 4, the handle 32 of the power tool 10 surrounds and supports an electrically non-conductive driveshaft 12. Due to the non-conductive material of the driveshaft 12 and the handle 32, the user end 14 of the power tool 10 is electrically insulated from the output end 16 of the power tool 10 (e.g., a chain or like working element). The driveshaft 12 is rotatably coupled to an input shaft 18 of the powerhead 46 by a first coupling 20 (FIG. 5) having a first securing portion 21 and a second securing portion 23. Similarly, the driveshaft 12 is rotatably coupled to a driven shaft 22 of the working element 24 with another or second coupling 20. In the illustrated embodiment, the first and second couplings 20 are jaw-type couplings 20 (FIG. 5) where the first securing portion 21 may be coupled to the powerhead 46 or the tool head 42, and the second securing portion 23 is coupled to the driveshaft 12. The jaw-type couplings 20 allow for slightly misaligned shaft couplings and may also reduce vibration felt by the user during operation of the power tool 10.

The power tool 10 may further include one or more washers 36 that surround the driveshaft 12 to hold the driveshaft 12 in position and protect the coupling 20 from wear or slipping out of position. As shown in FIGS. 1, 2, and 4, one or more clamps 40 couple the handle 32 with the tool head 42 and couple the handle 32 with an input end 44 of the powerhead 46. The clamps 40 may include, for instance, tube clamps or sleeve clamps. As a result, the handle 32 may be uncoupled from the powerhead 46 and the tool head 42 to repair the driveshaft 12 or other components of the handle. Due to the non-conductive material of the driveshaft 12, the connection between the non-conductive driveshaft 12 and other components of the power tool 10 that are formed of conductive material are important to reduce wear on the driveshaft 12 and ensure the tool head 42 is electrically insulated from the operator and the powerhead 46. Other embodiments of the power tool 10 include different attachment methods for the driveshaft 12. Some non-limiting examples include a press-fit between the driveshaft 12 and the input shaft 18 or an adhesive joining the driveshaft 12 and the input shaft 18.

With continued reference to FIGS. 3 and 4, the power tool 10 includes a greased tube 30 that defines an axial passageway 15 for the driveshaft 12 to ride in. The tube 30 may also be non-conductive to further electrically insulate the user end 14 of the power tool 10 from the output end 16. In the illustrated embodiment, the tube 30 is a separate component from and is positioned within the handle 32. In some embodiments, the tube 30 has an inner diameter of about 0.525 inches. In some embodiments, the handle 32 has an outer diameter of about 1.25 inches.

The non-conductive driveshaft 12 includes a driveshaft sleeve 34 pressed onto each end of the driveshaft 12 that rides inside a needle bearing 35 to protect the non-conductive material of the driveshaft 12 from wearing due to direct interaction with the needle bearing 35. In such embodiments, the driveshaft sleeve 34 may be constructed of a metallic material (e.g., steel, aluminum, etc.) and may have an inner diameter of 0.5 inches, an outer diameter of 0.75 inches, and a length of 1 inch. The tube 30 may surround the driveshaft 12 and the driveshaft sleeves 34. The corresponding needle bearing 35 may have an inner diameter of 0.75 inches and an outer diameter of 1 inch. In some embodiments, the driveshaft sleeve 34 may be coupled to an adapter sleeve 39 to secure the driveshaft 12 to the input shaft 18. The tube 30 may also be spaced from the handle 32 by one or more spacers, or O-rings, 38. These spacers 38 may surround the tube 30 and function to properly position the tube 30 within the handle 32 and also may reduce vibration experienced by the user.

Referring to the electrically non-conductive driveshaft 12 of the power tool 10, as shown in FIGS. 3 and 4, the drive shaft 12 can include any appropriate non-conductive material, non-limiting examples of which include fiberglass, fiberglass reinforced plastic, wood, PVC, PEX, any other plastic or polymer, a composite material, and the like. In some embodiments, the driveshaft 12 includes at least one section of non-conductive material such that a portion of the length of the driveshaft 12 is non-conductive. This non-conductive material section can be less than half of the length of the driveshaft 12. Other embodiments of the power tool 10 include the non-conductive material section being less than a third of the length of the driveshaft 12. Still, other embodiments of the power tool 10 include the entire driveshaft 12 being made of non-conductive material.

Due to the non-conductive material of the drive shaft 12, the user end 14 of the power tool 10 and the operator are electrically insulated from the output end 16 of the power tool 10 (e.g., a chain or like working element). In one embodiment of the power tool 10, the driveshaft 12 is configured to withstand 328,100 Volts per meter of length or more for at least 5 minutes.

In some embodiments, the driveshaft 12 is made from a fiberglass reinforced plastic so the driveshaft 12 can withstand 328,100 volts per meter (100,000 volts per foot) of length for 5 minutes. In other embodiments, the driveshaft 12 is made from wood or a wood composite and can withstand 246,100 volts per meter (75,000 volts per foot) of length for 3 minutes.

During operation of the power tool 10, the driveshaft 12 may be configured to spin at about 10,000 revolutions per minute. The driveshaft 12 is further configured to experience a torque of about 1 to 2 ft-lbs. In some embodiments, the driveshaft 12 has an outer diameter of 0.5 inches and has a length of about 5 feet. In some embodiments, the driveshaft 12 is strengthened. For fiberglass driveshafts 12, the glass content may be higher than typical fiberglass.

With reference to FIGS. 6 and 7, the power tool 10 may include one or more non-conductive bushings 48 that are disposed within the handle 32. The one or more non-conductive bushings 48 may surround the coating or driveshaft sleeve 34 (FIG. 6) so the driveshaft sleeve 34 rides inside the one or more non-conductive bushings 48 (FIG. 7) on each side of the driveshaft 12. The bushings 48 or the coating may cover or surround segments of the non-conductive driveshaft 12 or the entire length of the driveshaft 12.

Figure 8:
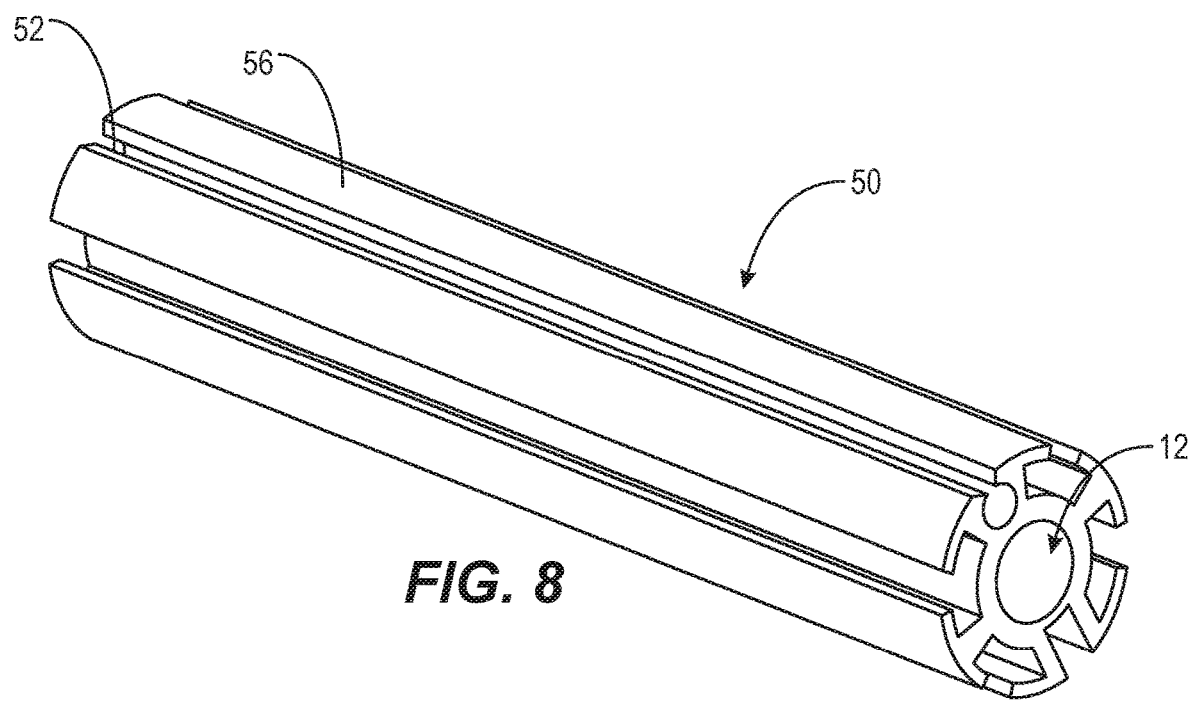
FIG. 8 is a perspective view of an alternative handle with a driveshaft sleeve forming a single unitary part therewith.

With reference to FIG. 8, a driveshaft alignment structure 50 is disclosed. The driveshaft alignment structure 50 may be used in place of the driveshaft sleeve 34 or in conjunction with the driveshaft sleeve 34 to support the driveshaft 12 within the handle 32. The driveshaft alignment structure 50 includes a grooved outer structure 52 and may include supports 56 or O-rings (not shown) located along the length of the driveshaft alignment structure 50 that engage with an inner diameter of the handle 32. The driveshaft alignment structure 50 may dampen the vibration of the power tool and align the driveshaft 12 in the center of the handle 32. In some embodiments, the driveshaft alignment structure 50 may be formed as an extrusion within the handle 32.

Figure 9:
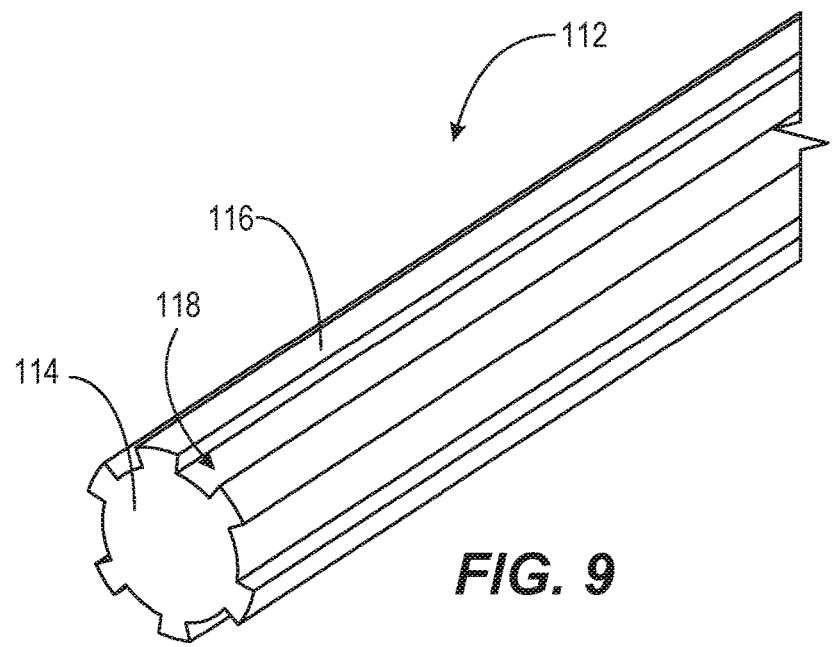
FIG. 9 is a partial perspective view of an alternative geometry of a driveshaft of the pole saw of FIG. 1.

FIG. 9 illustrates another embodiment of a driveshaft 112. The driveshaft 112 is similar to the driveshaft 12 described above with reference to FIGS. 1-7, and the following description focuses primarily on differences between the driveshaft 112 and the driveshaft 12. The driveshaft 112 is constructed of a non-conductive material and includes a main body 114, splines or ribbings 116 extending outward from the main body 114, and a gap 118 positioned between adjacent splines 116. The splines 116 may extend along the length of the driveshaft 112. In some embodiments, an internal surface of an input shaft of a powerhead, similar to powerhead 46, may be splined and received in the plurality of gaps 118 to engage with the plurality of splines 116 and transmit torque to the driveshaft 112, In some embodiments, the main body 114 may be formed of a first non-conductive material and the splines 116 may be formed of a second non-conductive material that is stronger or reinforced. For example, the driveshaft 112 may be formed from a material having a higher amount of glass content than typical fiberglass. In other embodiments, the splines may be formed of a non-conductive material, while the body is formed of a conductive material.

Figure 10:
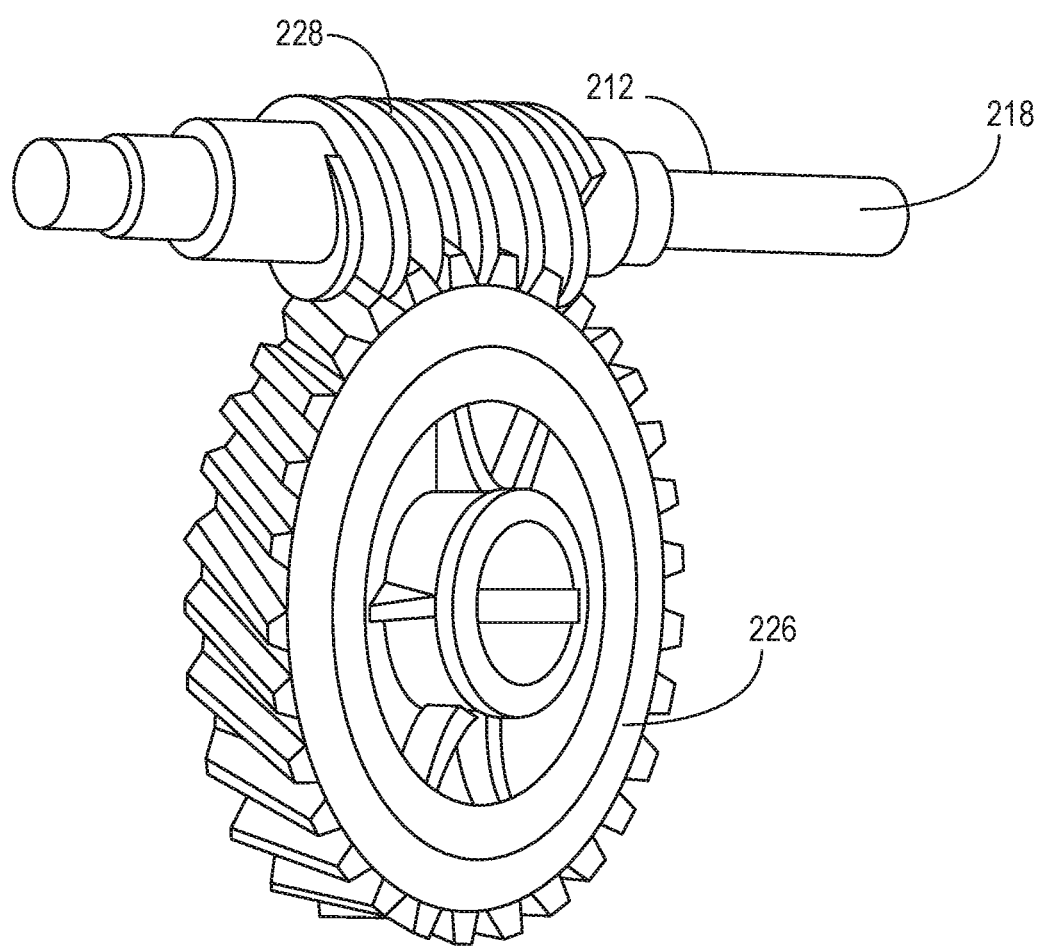
FIG. 10 is a perspective view of an alternative output drive gear of the pole saw of FIG. 1.

FIG. 10 illustrates another embodiment of a driveshaft 212. The driveshaft 212 is similar to the driveshaft 12 and the driveshaft 112 described above with reference to FIGS. 1-9, and the following description focuses primarily on differences between the driveshaft 212 and the driveshafts 12, 112. The driveshaft 212 is constructed of a non-conductive material and includes an input shaft 218. The input shaft 218 may be directly connected to a powerhead, similar to the powerhead 46, so the driveshaft 212 may be formed of a single unitary piece. In the illustrated embodiment, the driveshaft 212 includes a drive gear 228 that is formed on outer diameter of the driveshaft 212 and engages with a driven shaft or an output gear 226. The output gear 226 may be configured to drive a tool head, similar to the tool head 42. The drive gear 228 may be formed of non-conductive material stronger or reinforced compared to the non-conductive material of the rest of the drive shaft 212.

Figure 11:
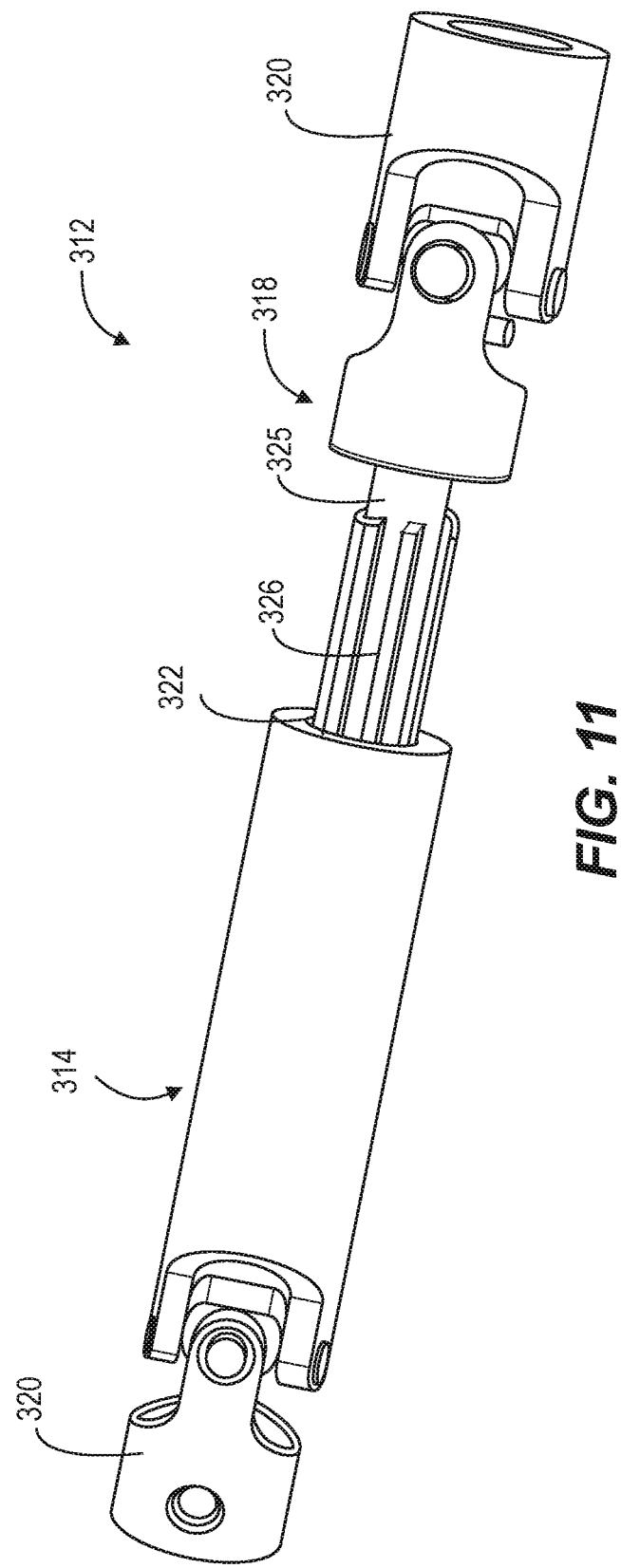
FIG. 11 is a perspective view of an alternative driveshaft that is telescopic.

FIG. 11 illustrates yet another embodiment of a driveshaft 312. The driveshaft 312 is similar to the driveshaft 12, the driveshaft 112, and the driveshaft 212, described above with reference to FIGS. 1-10, and the following description focuses primarily on differences between the driveshaft 312 and the driveshafts 12, 112, 212. The driveshaft 312 includes a first driveshaft portion 314 having an internal bore 322 and a second driveshaft portion 318 having an external surface 325 sized to be received in the internal bore 322. In the illustrated embodiment, the external surface includes a splined external surface 326. The internal bore 322 is sized to receive the splined external surface 326 to allow the driveshaft 312 to be telescoping or otherwise adjustable. In some embodiments, one or both of first driveshaft portion 314 and the second driveshaft portion 318 may be constructed of a non-conductive material. In other embodiments, the splined external surface 326 may be constructed of non-conductive material.

In some embodiments, the external surface 325 may include a stop that restricts the travel distance of the first driveshaft portion 314 relative to the second driveshaft portion 318 so the first and second drive shaft portions 314, 318 do not separate. The driveshaft 312 is coupled to first and second couplings 320 that attach the driveshaft 312 to a tool head and a powerhead, similar to the tool head 42 and powerhead 46.

Figure 12:
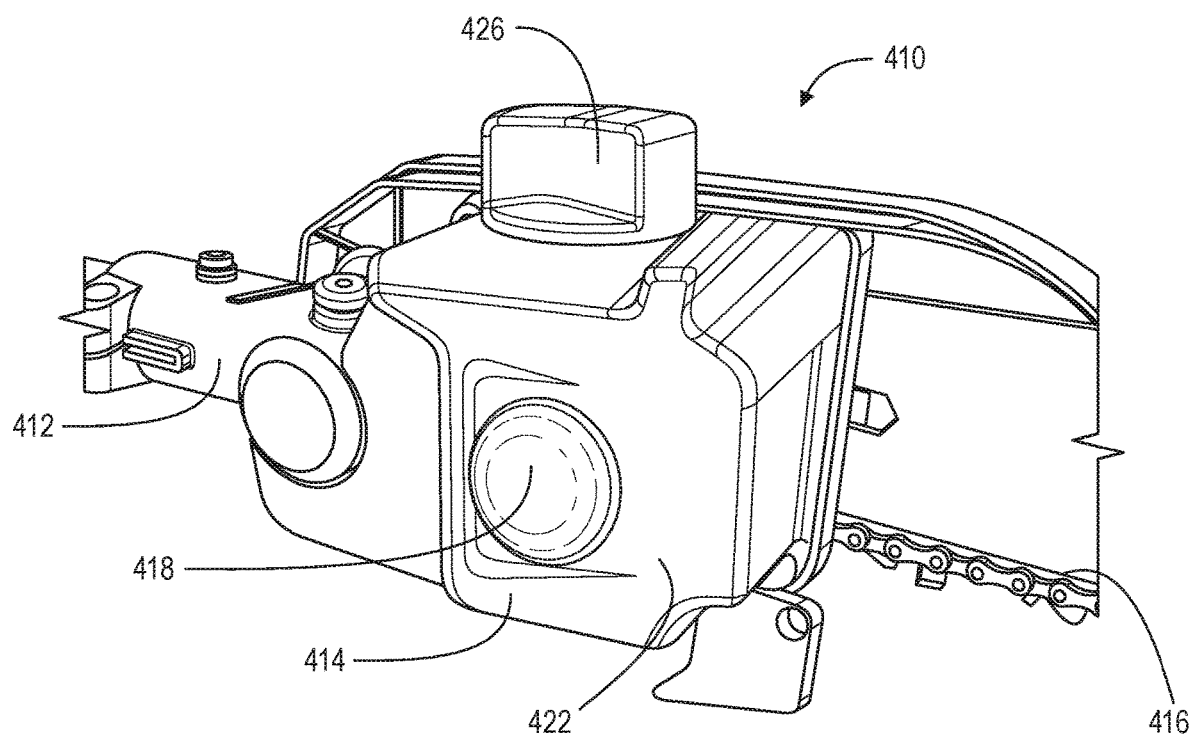
FIG. 12 is a perspective view of an oil tank of a power tool.
Figure 13B:
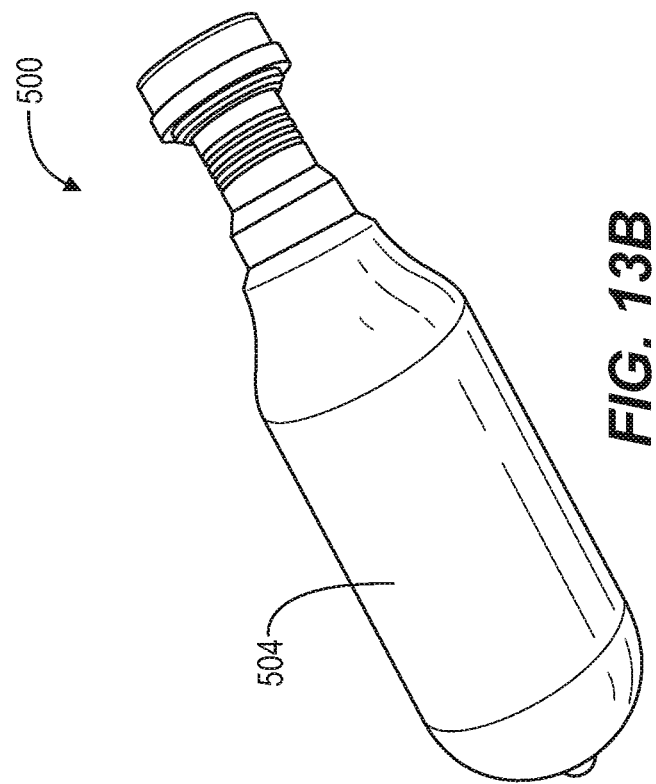
FIG. 13B is a perspective view of the flexible container in an expanded state.

FIGS. 12-13B illustrate multiple embodiments of an oil tank 414 for use with a powerhead of a power tool 410 and configured to maintain a constant or near constant internal pressure of an oil tank 414 of the power tool 410. The term "near constant," or "approximately constant" means that the internal pressure of the oil tank 414 does not dramatically increase or decrease. For example, the internal pressure remains at a state that does not affect the operational state of the power tool. In standard rigid fluid tanks, the internal pressure of the oil tank may increase as the ambient temperature rises within the oil tank (e.g., due to expansion of the contents within the oil tank). The rise in internal pressure may lead to oil leaking from the oil tank. For example, the oil may leak out of a cap of the oil tank or through other conduits that provide the combustible fuel to the power head of the power tool.

In FIG. 12, the illustrated the power tool 410 is a chain saw that includes a handle 412 that is graspable by a user, the powerhead, and a tool head having a working element 416 that is operated in response to powerhead. In other embodiments, the power tool 410 may be similar to the power tool 10 described above. While FIGS. 12-13B are described as an oil tank, it should be appreciated that the oil tank may be any fluid tank that is configured to hold a combustible fuel (e.g., gas, oil, etc.). The combustible fuel is sealed within the fluid tank that defines the internal pressure of the fluid tank.

FIG. 12 illustrates an embodiment of the oil tank 414 including a diaphragm 418 positioned on a sidewall 422 of the oil tank 414 and a cap 426 removably coupled to an upper portion of the oil tank 414. The oil tank 414 may be formed of a rigid plastic material with a hole positioned on the sidewall 422. In other embodiments, the oil tank 414 may be formed of other materials. In addition, the hole may be positioned in any location of the oil tank 414.

The diaphragm 418 is formed of an elastic or flexible material such as a rubber, elastomers, etc. that is configured to expand in response to an increase in the internal pressure of the fluid tank 414 above a threshold value. The diaphragm 418 is positioned within the hole to form an airtight seal within the oil tank 414. The diaphragm 418 may be secured within the hole by insert molding the diaphragm 418 over the hole, securing the diaphragm 418 over the hole via an adhesive, or any other method that forms an air tight seal therebetween. In other embodiments, the diaphragm 418 may be formed of any material that may expand a sufficient amount when the ambient temperature of the oil tank 414 increases.

The combustible fuel within the oil tank 414 has an initial or ambient temperature prior to operation of the power tool 410. When the combustible fuel has the initial temperature, the diaphragm 418 is in an unexpanded state. During operation of the power tool 410, the ambient temperature increases within the oil tank 414 due to the operation of the power tool 410 and/or the environmental temperature. The increase in ambient temperature above a predetermined threshold value, expands the contents of the oil tank 414 (e.g., air and gas particles), thus exerting a force on the diaphragm 418. The force on the diaphragm 418 expands or bulges the diaphragm 418 to define an expanded state of the diaphragm 418, which increases the volume of the oil tank 414. In other words, the flexible material of the diaphragm 418 allows the diaphragm 418 to expand in response to an increase in internal pressure of the fluid tank 414 above a threshold value. As a result, increasing the volume of the oil tank 414 allows the internal pressure of the oil tank 414 to remain at a constant or near constant state without the need for additional venting. For example, the threshold value for the temperature of the combustible fuel and the internal pressure of the oil tank 414 may be directly related to the material of the diaphragm 418, the volume of the oil tank 414, etc. As a result, the movement of the diaphragm 418 in response to the threshold values allows the power tool to be at an optimal pressure of during operation of the power tool 410.

In some embodiments, the cap 426 may be loosened when the diaphragm 418 is in an expanded position (not shown). As such, force on the diaphragm 418 would slowly be reduced, which allows the diaphragm 418 to return to an unexpanded state (e.g., as displayed in FIG. 12). In other words, the cap 426 selectively releases pressure with the oil tank 414 to allow the diaphragm to return to the unexpanded state. In some embodiments, a vent may be positioned on the top of the oil tank and/or the cap to allow the user to reduce the force on the diaphragm 418. In other embodiments, the cap 426 may be similar to the cap described below and illustrated in FIGS. 14A-D.

Figure 13A:
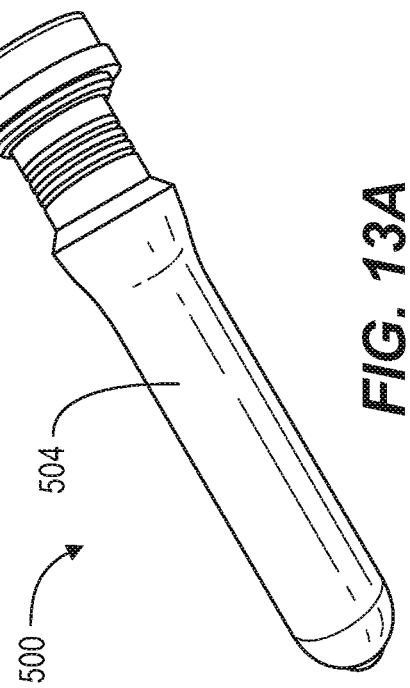
FIG. 13A is a perspective view of a flexible container in an unexpanded state.
Figure 14B:
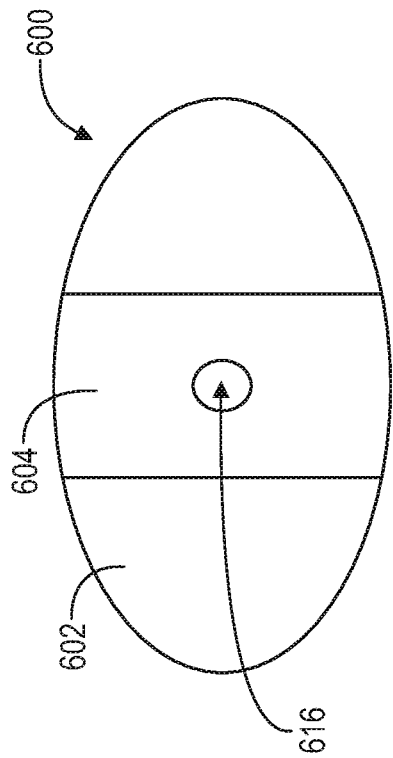
FIG. 14B is a top view of the oil cap of FIG. 14A.
Figure 14D:
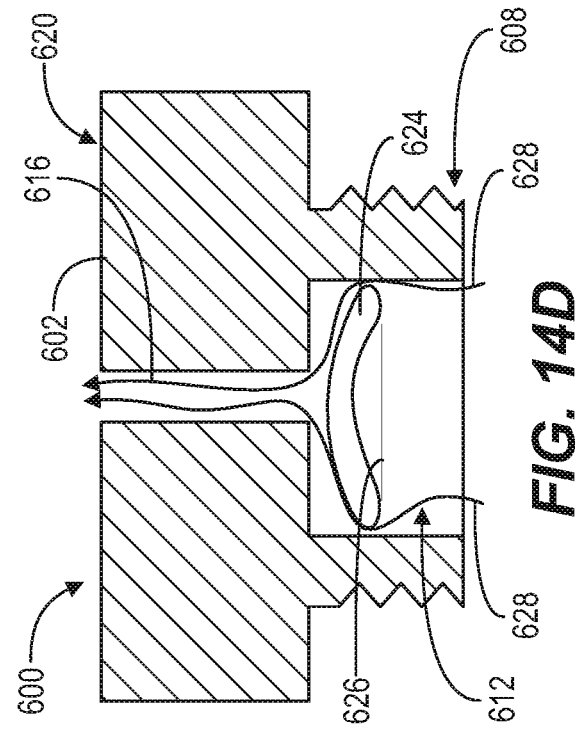
FIG. 14D is a cross-sectional view of the oil cap of FIG. 14A illustrating the diaphragm in bulged deformed position.
Figure 14A:
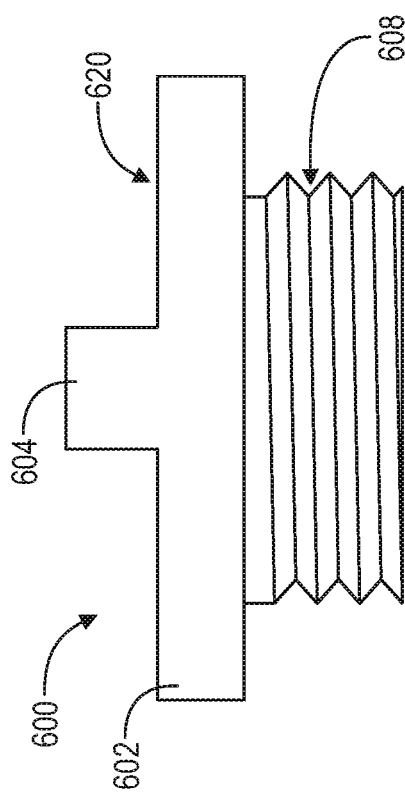
FIG. 14A is a side view of an oil cap according to one embodiment.
Figure 14C:
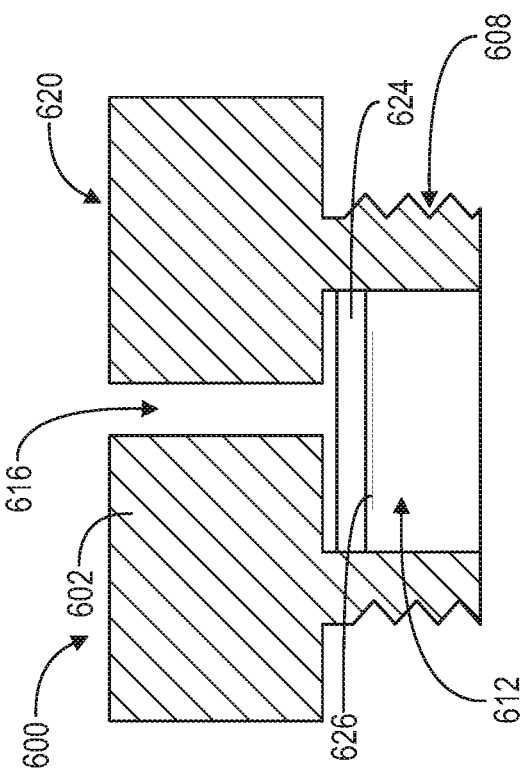
FIG. 14C is a cross-sectional view of the oil cap of FIG. 14A illustrating a diaphragm in a resting position.

FIGS. 13A and 13B illustrate a flexible container 500 in unexpanded state (FIG. 13A) and an expanded state (FIG. 13B). The flexible container 500 is used to illustrate the concept of a flexible body 504 expanding as the ambient temperature increases inside the flexible body 504 to allow for the pressure within the flexible body 504 to remain at a near constant state. As such, instead of forming the oil tank 414 of a rigid plastic material, a flexible oil tank (not shown) be formed of a flexible material such as rubber and act as single component that defines the oil tank 414 and the diaphragm 418. In other words; the diaphragm 418 may formed the entire oil tank 414 to define the flexible oil tank. The flexible oil tank may be attached to the power tool 410 and include any of the features of the oil tank 414.

The flexible oil tank includes an unexpanded state (FIG. 13A) and an expanded state (FIG. 13B) similar to the flexible container 500. During operation, the ambient temperature increases within the flexible oil tank due to the operation of the power tool 410 and/or the environmental temperature. The increase in ambient temperature expands the contents of the flexible oil tank, thus exerting a force on an outer wall of the flexible oil tank. The force on the flexible oil tank expands or bulges the flexible oil tank, which increases the volume of the flexible oil tank. Increasing the volume of the flexible oil tank allows the internal pressure of the flexible oil tank remain at a constant or near constant state.

FIG. 14A-D illustrate an embodiment of a cap 600 for a fluid tank. The cap 600 includes a body 602 defining a handle 604, a threaded portion 608, an internal channel 612, and a breather aperture 616 in communication with the internal channel 612. The breather aperture 616 is positioned on an upper portion 620 of the cap 600. A diaphragm 624 is positioned between the breather aperture 616 and the internal channel 612. The handle 604 and the threaded portion 608 allow the cap 600 to be removably attached to a fluid tank of a power tool similar to oil tank 414 (FIG. 12), The internal channel 612 is configured to accept and secure the diaphragm 624 within the cap 600.

The diaphragm 624 is formed of flexible material, such as a rubber, to allow the diaphragm 624 to deform within the internal channel 612. The diaphragm 624 may be secured by a ledge 626 extending from the internal channel 612. For example, the ledge 626 may include a central portion that supports the diaphragm 624 and vents that allows the excess pressure (e.g., in the form of the gas and/or air particles) to disperse from the oil tank through the ledge 626. In other embodiments, the diaphragm 624 may be adhered to an upper portion of the internal channel 612 and/or breather aperture 616.

During operation, the ambient temperature increases within the oil tank, due to the operation of the power tool 410 and/or the environmental temperature. The increase in ambient temperature expands gas and air particles within of the oil tank, thus exerting a force on the diaphragm 624. The diaphragm 624 may deform to move the diaphragm from an unexpanded state (FIG. 14C) to an expand state (FIG. 14D) to allow excess pressure (e.g., in the form of the gas and/or air particles) to be released out of the internal channel 612 along arrows 628 and through the breather aperture 616. Once the pressure within the oil tank 414 is released, the diaphragm 624 move to the unexpanded state to seal the oil tank 414. As such, the pressure of the oil tank remains at a constant or near constant state. In other embodiments, the diaphragm 624 may include at least one slit, which bulges or expands when the ambient temperature increases within the oil tank.

In some embodiments, the cap 600 may be used in conjunction with the oil tank 414 having the diaphragm 418. For example, the diaphragm 418 of the oil tank 414 may expand or bulge the diaphragm 418 to the expanded state. Once the diaphragm reaches a fully expanded state (e.g., a point where the diaphragm cannot further expand), the internal pressure of the tank may increase. As a result, the diaphragm 624 of the cap 600 may deform to move the diaphragm 624 to the expanded state (FIG. 14D) to allow the excess pressure be released out of the internal channel 612 along arrows 628 and through the breather aperture 616. When the excess pressure is released, the diaphragm of the oil tank 414 may return to the unexpanded state. Once the diaphragm 418 of the oil tank 414 reaches the unexpanded state, the diaphragm 624 of the cap 600 moves to the unexpanded state (FIG. 14C) to seal the oil tank 414. As a result, the diaphragm 624 acts as a backup pressure release mechanism to ensure the diaphragm 418 does not burst or rupture due to over expansion.

Although the invention has been described in detail with reference to certain preferred embodiments, variations and modifications exist within the scope and spirit of one or more independent aspects of the invention as described.

Various features and advantages of the present subject matter are set forth in the following claims.

The invention claimed is:

1. A fluid tank system for a power tool, the fluid tank system comprising:
    a fluid tank configured to hold a fluid, the fluid tank defining an internal volume having an internal pressure;
    a diaphragm forming at least a portion of the fluid tank, the diaphragm formed of a flexible material, the diaphragm having an unexpanded state and an expanded state, the diaphragm being configured to move from the unexpanded state to the expanded state when a temperature of the fluid increases the internal pressure above a predetermined pressure; and
    a cap that is operably coupled to the fluid tank,
    wherein movement of the diaphragm to the expanded state increases the internal volume of the fluid tank to allow the internal pressure of the fluid tank to remain approximately constant,
    wherein the cap is configured selectively release the pressure within the fluid tank to allow the diaphragm to return to the unexpanded state.

2. The fluid tank system of claim 1, wherein the fluid tank is formed of a rigid material and defines a hole that is configured to receive the diaphragm.

3. The fluid tank system of claim 2, wherein the diaphragm is insert molded over the hole of the fluid tank to form an air tight seal between the diaphragm and the fluid tank.

4. The fluid tank system of claim 3, wherein the increase in the internal pressure exerts a force on the diaphragm that expands the diaphragm to define the expanded state of the diaphragm, wherein the expanded state of the diaphragm increases the internal volume of the fluid tank to allow the internal pressure of the fluid tank to remain approximately constant without the need for additional venting of the fluid tank.

5. The fluid tank system of claim 1, wherein the diaphragm forms the entire fluid tank to define a flexible fluid tank, wherein the flexible fluid tank is expandable between the unexpanded state and the expanded state to allow the internal pressure of the fluid tank to remain approximately constant.

6. The fluid tank system of claim 1, wherein the diaphragm is a first diaphragm and the cap further comprises a second diaphragm, wherein the second diaphragm moves between an unexpanded state and an expanded state.

7. The fluid tank system of claim 6, wherein the second diaphragm moves to the expanded state when the first diaphragm is in a fully expanded state to release pressure within the fluid tank so the first diaphragm returns to the unexpanded state.

8. The fluid tank system of claim 1, wherein the fluid is an oil.

9. The fluid tank system of claim 1, wherein the fluid is a combustible fuel.

10. A power tool comprising:
    a tool head having a working element;
    a powerhead configured to provide power to the working element;
    a fluid tank configured to hold a fluid, the fluid tank defining an internal volume having an internal pressure;
    a diaphragm forming at least a portion of the fluid tank, the diaphragm formed of a flexible material, the diaphragm configured to expand in response to an increase in the internal pressure of the fluid tank above a predetermined pressure; and
    a cap that is operably coupled to the fluid tank,
    wherein expansion of the diaphragm increases the internal volume of the fluid tank to maintain the internal pressure of the fluid tank at a near constant value,
    wherein the cap is configured selectively release the pressure within the fluid tank to allow the diaphragm to return to the unexpanded state.

11. The power tool of claim 10, wherein the diaphragm is configured to move from an unexpanded state to an expanded state when a temperature of the fluid increases the internal pressure above the predetermined pressure.

12. The power tool of claim 11, wherein the fluid tank is formed of a rigid material and defines a hole that is configured to receive the diaphragm, wherein the diaphragm is insert molded over the hole of the fluid tank to form an air tight seal between the diaphragm and the fluid tank.

13. The power tool of claim 12, wherein the increase in the internal pressure exerts a force on the diaphragm that expands the diaphragm to define the expanded state of the diaphragm.

14. The power tool of claim 10, wherein the diaphragm forms the entire fluid tank to define a flexible fluid tank, wherein the flexible fluid tank is expandable between an unexpanded state and an expanded state to allow the internal pressure of the flexible fluid tank to remain at the near constant value.

15. The power tool of claim 10, wherein the diaphragm is a first diaphragm and the cap further comprises a second diaphragm, wherein the second diaphragm moves between an unexpanded state and an expanded state.

16. The power tool of claim 15, wherein the second diaphragm moves to the expanded state when the first diaphragm is in a fully expanded state to release pressure within the fluid tank so the first diaphragm returns to the unexpanded state.

17. The power tool of claim 10, wherein the fluid is an oil.

18. The power tool of claim 10, wherein the fluid is a combustible fuel.

19. A cap for a fluid tank of a power tool, the cap comprising:
    a body defining a handle configured to be grasped by a user, a threaded portion configured to be attached to the fluid tank, an internal channel, and a breather aperture in communication with the internal channel;
    a diaphragm supported by a ledge within the internal channel, the diaphragm being positioned between the internal channel and the breather aperture to seal the fluid tank, the diaphragm being formed of a flexible material to allow the diaphragm to move between an unexpanded state and an expanded state in response to an increase in an internal pressure of the fluid tank,
    wherein movement of the diaphragm to the expanded state allows excess pressure to be released out of the internal channel and through the breather aperture.

20. A power tool comprising:
    a tool head having a working element;
    a powerhead configured to provide power to the working element;
    the fluid tank configured to hold a fluid, the fluid tank defining an internal volume having the internal pressure; and
    the cap of claim 19 operably coupled to the fluid tank.

21. The power tool of claim 20, wherein the fluid tank includes a second diaphragm forming at least a portion of the fluid tank, wherein the second diaphragm is formed of a flexible material to allow the second diaphragm to expand in response to an increase in the internal pressure of the fluid tank above a predetermined pressure.

22. The power tool of claim 21, wherein expansion of the second diaphragm increases the internal volume of the fluid tank to allow the internal pressure of the fluid tank to remain at a near constant value.

\* \* \* \* \*